United States Patent
Guisasola

(10) Patent No.: US 11,224,946 B2
(45) Date of Patent: Jan. 18, 2022

(54) APPARATUS AND METHOD FOR POSITIONING A CONNECTING ROD RELATIVE COMPONENTS UNDERLYING A CYLINDER OF AN ENGINE BLOCK

(71) Applicant: Caterpillar Energy Solutions GmbH, Mannheim (DE)

(72) Inventor: Inigo Guisasola, Dortmund (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 17/256,859

(22) PCT Filed: Jun. 21, 2019

(86) PCT No.: PCT/EP2019/025196
§ 371 (c)(1),
(2) Date: Dec. 29, 2020

(87) PCT Pub. No.: WO2020/007501
PCT Pub. Date: Jan. 9, 2020

(65) Prior Publication Data
US 2021/0138593 A1    May 13, 2021

(30) Foreign Application Priority Data

Jul. 2, 2018 (GB) .................................. 1810833

(51) Int. Cl.
*B23Q 3/00* (2006.01)
*B23P 19/04* (2006.01)
(Continued)

(52) U.S. Cl.
CPC ............ *B23P 19/043* (2013.01); *F02F 1/004* (2013.01); *F02F 7/0021* (2013.01)

(58) Field of Classification Search
CPC ... F02F 1/004; F02F 11/005; Y10T 29/49272; Y10T 29/4927
(Continued)

(56) References Cited

U.S. PATENT DOCUMENTS 2,909,164 A    10/1959    Biermann
2,923,055 A *   2/1960   Bradley, Jr. ........... B23P 19/025
                                                    29/283
(Continued)

FOREIGN PATENT DOCUMENTS

DE         203274 A1    10/1983
DE       19636089 A1     3/1997
(Continued)

OTHER PUBLICATIONS

International Search Report related to Application No. PCT/EP2019/025196; reported on Nov. 6, 2019.
(Continued)

*Primary Examiner* — Long T Tran
*Assistant Examiner* — James J Kim

(57) ABSTRACT

An apparatus is provided for positioning a connecting rod relative to one or more components underlying a cylinder of an engine block, in tandem with assembling a cylinder liner to the cylinder of the engine block. The apparatus has a holder mechanism releasably holding a bottom end of the cylinder liner. A portion of the holder mechanism is configured to extend beyond the bottom end of the cylinder liner to define a groove that is disposed parallel to a circumference of the cylinder liner. A link pivotally connects the cylinder liner to the connecting rod. The link includes a first end defining a pin that is slidably engaged with the groove of the holder mechanism and a second end that defines an
(Continued)

opening therethrough. The opening facilitates insertion of a fastener for releasably securing the link to a bottom end of the connecting rod.

15 Claims, 5 Drawing Sheets

(51) Int. Cl.
*F02F 1/00* (2006.01)
*F02F 7/00* (2006.01)

(58) Field of Classification Search
USPC .......................................................... 29/464
See application file for complete search history.

(56) References Cited

U.S. PATENT DOCUMENTS

| | | | |
|---|---|---|---|
| 6,729,273 B2 | 5/2004 | Aoyama et al. | |
| 6,761,137 B2 | 7/2004 | Kurtzer et al. | |
| 8,499,725 B2 | 8/2013 | Lee et al. | |
| 8,720,395 B2 | 5/2014 | Lee et al. | |
| 2008/0202461 A1* | 8/2008 | Rankin | B23P 19/043 123/142.5 R |
| 2012/0304954 A1* | 12/2012 | Kiser | F02F 1/004 123/193.2 |
| 2013/0055993 A1* | 3/2013 | Kantola | C23C 4/134 123/668 |
| 2014/0137406 A1* | 5/2014 | Firzlaff | B25B 27/06 29/888.061 |
| 2016/0377021 A1* | 12/2016 | Ardezzone | F02F 7/00 123/669 |
| 2018/0306099 A1* | 10/2018 | Suzuki | F02F 11/005 |
| 2019/0170082 A1* | 6/2019 | Coppola | F02F 1/004 |

FOREIGN PATENT DOCUMENTS

| | | |
|---|---|---|
| EP | 2818736 A1 | 12/2014 |
| WO | 2007101509 A1 | 9/2007 |

OTHER PUBLICATIONS

Great Britain Search Report related to Application No. 1810833.2; reported on Dec. 18, 2018.

* cited by examiner

APPARATUS AND METHOD FOR POSITIONING A CONNECTING ROD RELATIVE COMPONENTS UNDERLYING A CYLINDER OF AN ENGINE BLOCK

CROSS-REFERENCE TO RELATED APPLICATION

This Application is a 35 USC § 371 US National Stage filing of International Application No. PCT/EP2019/025196 filed on Jun. 21, 2019 which claims priority under the Paris Convention to Great Britain Patent Application No. 1810833.2 filed on Jul. 2, 2018.

TECHNICAL FIELD

The present disclosure generally relates to an apparatus for assembling at least one component onto an engine block of an internal combustion engine. More particularly, the present disclosure relates to an apparatus for positioning a connecting rod relative to one or more components underlying a cylinder of an engine block, in tandem with assembling a cylinder liner to the cylinder of the engine block.

BACKGROUND

Internal combustion engines typically include various types of components that are assembled together for co-operatively produce power in operation. When assembling one or more of these components, it has been observed that some components may be difficult to assemble owing to the presence of other components located in the vicinity of the one or more components to be assembled. For instance, a camshaft may be located in the vicinity of a crankshaft and when assembling a connecting rod onto the crankshaft, a bottom end of the connecting rod may instead come into contact with the camshaft and prevent its assembly with the crankshaft. Moreover, owing to engine design, the geometry of other components present within an engine block may not only offer tight space constraints but be of such a high complexity that could potentially render pathways available to access within the engine block for accomplishing the assembly of the one or more components tortuous and therefore, tedious to perform.

Hence, there is a need for an apparatus that can be used for assembling components onto an engine block, particularly, for positioning a connecting rod relative to one or more components underlying a cylinder of an engine block.

SUMMARY OF THE DISCLOSURE

In one aspect of this disclosure, an apparatus is provided for positioning a connecting rod relative to one or more components underlying a cylinder of an engine block, in tandem with assembling a cylinder liner to the cylinder of the engine block. The apparatus has a holder mechanism releasably holding a bottom end of the cylinder liner. A portion of the holder mechanism is configured to extend beyond the bottom end of the cylinder liner to define a groove that is disposed parallel to a circumference of the cylinder liner. A link pivotally connects the cylinder liner to the connecting rod. The link includes a first end defining a pin that is slidably engaged with the groove of the holder mechanism, and a second end that defines an opening therethrough. The opening facilitates insertion of a fastener for releasably securing the link to a bottom end of the connecting rod.

In another aspect of the present disclosure, a method is provided for positioning a connecting rod relative to one or more components underlying a cylinder of an engine block in tandem with assembling a cylinder liner to the cylinder of the engine block. The method includes providing a holder mechanism for releasably holding a bottom end of the cylinder liner and defining a groove within a portion of the holder mechanism that extends beyond the bottom end of the cylinder liner. The groove would be defined such that the groove would be disposed parallel to a circumference of the cylinder liner. The method further includes providing a link having a first end defining a pin slidably engaged with the groove of the holder mechanism and a second end defining an opening to facilitate insertion of a fastener for releasably securing the link to a bottom end of the connecting rod. The method further includes urging the pin to follow a profile of the groove such that the second end of the link is biased to move the bottom end of the connecting rod while preventing the bottom end of the connecting rod from coming into contact with the one or more components underlying the cylinder.

Other features and aspects of this disclosure will be apparent from the following description and the accompanying drawings.

BRIEF DESCRIPTION OF THE DRAWINGS

The features and advantages of the present disclosure will become more apparent from the detailed description set forth below when taken in conjunction with the drawings.

DETAILED DESCRIPTION

The present disclosure relates to an apparatus for assembling at least one component onto an engine block of an internal combustion engine. More particularly, the present disclosure relates to an apparatus for positioning a connecting rod relative to one or more components underlying a cylinder of an engine block, in tandem with assembling a cylinder liner to the cylinder of the engine block.

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
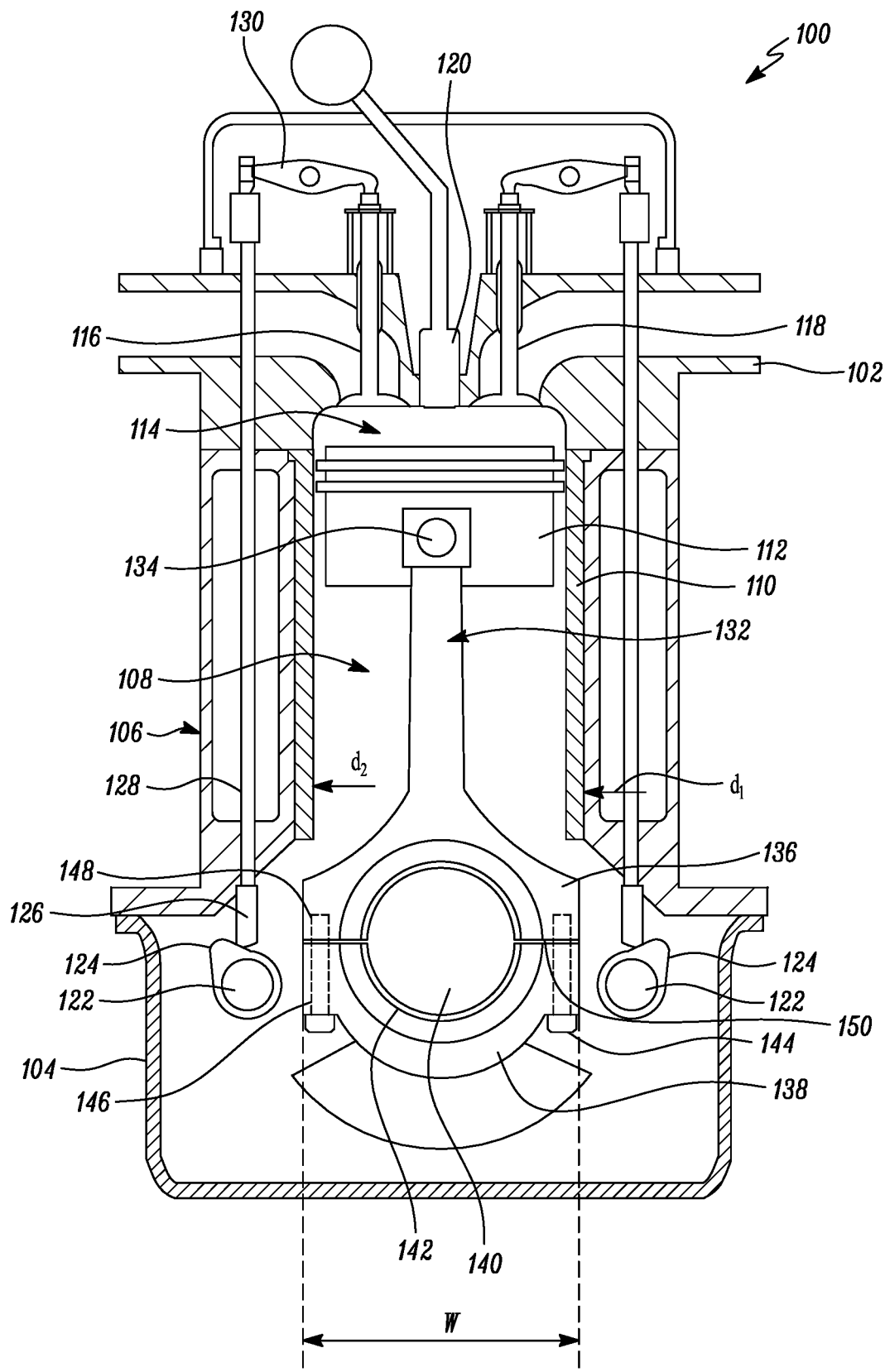
FIG. 1 is a schematic of an exemplary internal combustion engine having an engine block, a cylinder, a cylinder liner, a crankshaft, a pair of camshafts, a piston, and a connecting rod in accordance with embodiments of the present disclosure.

With reference to FIG. 1, an exemplary internal combustion engine 100 is depicted, in which embodiments of the present disclosure may be implemented. In the illustrated embodiment of FIG. 1, the engine 100 is exemplarily embodied in the form of a compression ignited (CI) engine, for example, a direct injection diesel engine. However, in other embodiments, the engine 100 may alternatively embody a spark ignited (SI) engine in lieu of the CI engine disclosed herein.

As shown, the engine 100 includes an engine head 102, a crankcase 104, and an engine block 106 located between the engine head 102 and the crankcase 104. The engine block 106 is disposed is sealing engagement with each of the engine head 102 and the crankcase 104. The engine block 106 also defines a cylinder 108 that receives a cylinder liner 110 therein. The cylinder liner 110 may be configured to establish an interference fit with the engine block 106 vis-à-vis the cylinder 108 of the engine block 106.

The cylinder liner 110 would also receive a piston 112 therein that would be disposed in slidable engagement with the cylinder liner 110. The piston 112 together with the engine head 102 and the engine block 106 would define a combustion chamber 114 therebetween. The engine head 102 also supports an inlet valve 116 and an exhaust valve 118 that are independently operable of each other for administering charge air into the combustion chamber 114 and egressing products of combustion respectively.

In the illustrated exemplary embodiment of FIG. 1, the engine 100 may also include a fuel injector 120 to inject a jet of fuel (not shown) into the combustion chamber 114 for combustion. Although the engine 100 is depicted as a CI engine in the view of FIG. 1, it may be noted that the type of engine 100 is merely exemplary in nature and hence, non-limiting of this disclosure. Other configurations of engines known to persons skilled in the art, such as an SI engine employing a spark plug may be implemented for purposes of realizing embodiments herein without limiting the scope of the present disclosure.

A pair of camshafts 122 bearing 142 thereon respective cams 124 may be positioned within and supported by either the engine block 106, or by the crankcase 104 as exemplarily shown in illustrated embodiment of FIG. 1. Each cam 124 would be rotatively operable to linearly displace a corresponding follower 126 such that an associated follower link 212 rod 128 could actuate a corresponding rocker arm 130, that could in turn, open or close an access pathway to or from the combustion chamber 114 via corresponding ones of the inlet and exhaust valves 116, 118.

A connecting rod 132 is provided to connect the piston 112 to a crankshaft 140. As shown, the connecting rod 132 would be swivelably connected to the piston 112 using a gudgeon pin 134. Moreover, the connecting rod 132 would also be connected to the crankshaft 140 with the help of a bearing 142, for example, a journal bearing. In operation i.e., upon combustion of a fuel-air mixture within the combustion chamber 114, the connecting rod 132 would transform reciprocal motion of the piston 112 into rotary motion of the crankshaft 140.

Further, as shown, the connecting rod 132 includes a top portion 136 and a bottom portion 138 that is secured to the top portion 136 using a pair of fasteners 144, for example, bolts. The bottom portion 138 of the connecting rod 132 defines a pair of through-holes 146 that receive the fasteners 144 therethrough. The connecting rod 132 also includes a pair of receptacles 148 located adjacent a bottom end 150 of the top portion 136 for releasably engaging with end portions of the pair of fasteners 144. For sake of simplicity and brevity in this disclosure and to aid the reader in understanding the present disclosure, the terms "the bottom end 150 of the top portion 136 of the connecting rod 132" disclosed herein will hereinafter be simply referred to as "the bottom end 150 of the connecting rod 132".

In the exemplary illustrated embodiment of FIG. 1, a width W of the connecting rod 132 is greater than an inner diameter $d_2$ of the cylinder liner 110 and less than the outer diameter $d_1$ of the cylinder liner 110. Due to the inter-relative sizing of the bottom end 150 of the connecting rod 132 and the sizing of the cylinder liner 110 i.e., $d_1 > W > d_2$, it may be desirable to use an apparatus 200 that, as shown in FIG. 2A through 4B, is provided for assembling the connecting rod 132 and the cylinder liner 110 to the engine block 106.

Figures 2A, 2B:
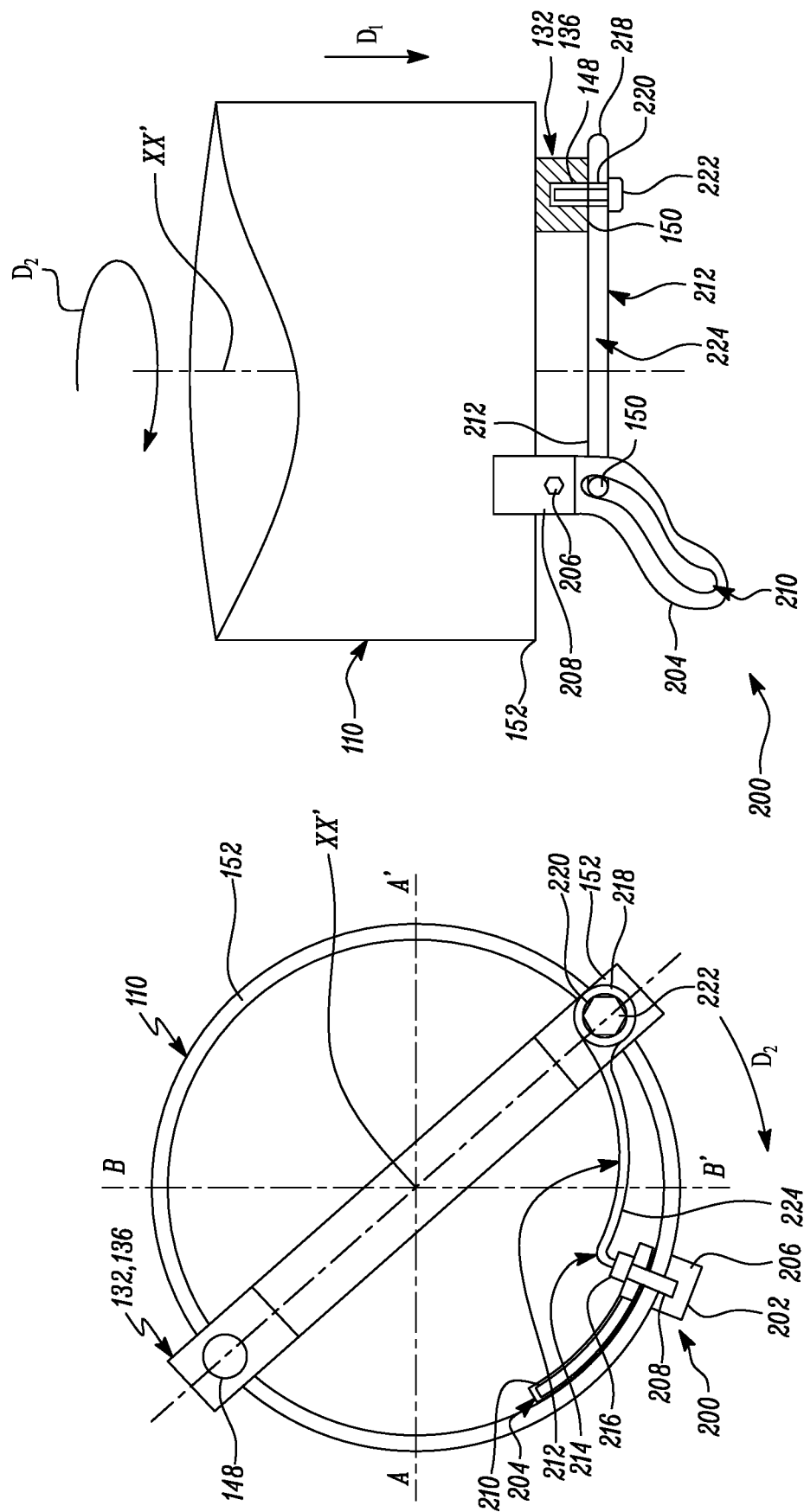
FIGS. 2A and 2B are bottom and front diagrammatic views of the cylinder liner, the connecting rod, and an adapter for positioning the connecting rod, in accordance with embodiments of the present disclosure.

Referring now to FIGS. 2A and 2B, the apparatus 200 has a holder mechanism 202. The holder mechanism 202 is configured to releasably hold the bottom end 152 of the cylinder liner 110. The holder mechanism 202 includes a pair of portions 204, 206. These portions 204, 206 could comprise of an inner strip 204 and an outer strip 206 as shown in the illustrated embodiments of FIGS. 2A and 2B and the portions 204, 206 of the holder mechanism 202 will therefore be interchangeably referred to as "the inner strip" and "the outer strip" and denoted by corresponding ones of identical reference numerals "204" and "206" respectively.

The inner strip 204 would be disposed adjacent to an inner surface of the cylinder liner 110 while the outer strip 206 would be disposed adjacent to an outer surface of the cylinder liner 110. Moreover, the inner and outer strips 204, 206 would be secured to one another using a fastener 208, for example, a bolt, an Allen screw, a grub screw, or any other suitable type of fastener known to persons skilled in the art. The fastener 208 would be torqued to help facilitate the inner and outer strips 204, 206 to grip against and hence, hold the bottom end 152 of the cylinder liner 110.

A portion of the holder mechanism 202, for example, the inner strip 204 as best shown in the illustrated embodiment of FIG. 2B would be configured to extend beyond the bottom end 152 of the cylinder liner 110 to define a groove 210 that is disposed parallel to a circumference of the cylinder liner 110. Referring to FIGS. 2A and 2B, the groove 210 has a curvilinear profile.

Although in the illustrated embodiment of FIG. 2B, the inner strip 204 is shown extending beyond the bottom end 152 of the cylinder liner 110, in other embodiments, depending on specific requirements of an assembling application, the outer strip 206 could be configured to extend beyond the bottom end 152 of the cylinder liner 110 to define the groove 210 in lieu of the inner strip 204. Therefore, it will be appreciated by persons skilled in the art that such modifications to the portions 204, 206 of the holder mechanism 202 may be made without deviating from the spirit of the present disclosure and limiting a scope of the present disclosure as defined by the claims appended herein.

A link 212 would pivotally connect the cylinder liner 110 to the connecting rod 132. The link 212 would include a first end 214 that defines a pin 216 slidably engaged with the groove 210 of the holder mechanism 202. The link 212 would also include a second end 218 distal from the first end 214. The second end 218 would define an opening 220 therethrough. This opening 220 would facilitate insertion of a fastener 222 for releasably securing the link 212 to the bottom end 150 of the connecting rod 132.

Referring to FIG. 1 and also to FIGS. 2A and 2B, it is hereby contemplated that in one mode of assembling the cylinder liner 110 to the engine block 106, the top portion 136 of the connecting rod 132 and the piston 112 would first be connected with the help of the gudgeon pin 134. Thereafter, the piston 112 would be inserted through the bottom end 152 of the cylinder liner 110 so as to be slidably received within the cylinder liner 110. The holder mechanism 202 would then be secured to the bottom end 152 of the cylinder liner 110 with the help of the fastener 208 to releasably hold the bottom end 152 of the cylinder liner 110. Further, the pin 216 would be slidably engaged with the groove 210 and the second end 218 of the link 212 would be releasably secured to the bottom end 150 of the connecting rod 132 using the fastener 222. Thereafter, the cylinder liner 110 would be inserted into the engine block 106 vis-à-vis the cylinder 108 of the engine block 106. Thereafter, movement of the pin 216 within the curvilinear groove 210 would bias the second end 218 of the link 212 to displace the bottom end 150 of the connecting rod 132 axially and/or rotatively, in directions $D_1$ and $D_2$ respectively, relative to an axis XX' of the cylinder liner 110. It may be noted that the direction $D_1$ disclosed herein is parallel to the axis XX' of the cylinder liner 110 while the direction $D_2$ is disposed about the axis XX' of the cylinder liner 110. Therefore, movement of the bottom end 150 of the connecting rod 132 in the direction $D_2$ would mean a clockwise movement of the bottom end 150 of the connecting rod 132 from plane AA' to plane BB' as shown in the views of FIGS. 3A through 4B respectively.

With continued reference to FIG. 1 and also to FIGS. 2A and 2B, it has been further contemplated that in an alternative mode of assembling the cylinder liner 110 to the engine block 106, an initial assembly of the piston 112 to the connecting rod 132 would be omitted. Instead, the connecting rod 132 would be connected directly to the cylinder liner 110. Specifically, the holder mechanism 202 would first be secured to the bottom end 152 of the cylinder liner 110 with the help of the fastener 208. The pin 216 would then be slidably engaged with the groove 210 and the second end 218 of the link 212 would be releasably secured to the bottom end 150 of the connecting rod 132 using the fastener 222. Thereafter, the cylinder liner 110 would be inserted into the engine block 106 vis-à-vis the cylinder 108 of the engine block 106. Movement of the pin 216 within the curvilinear groove 210 would bias the second end 218 of the link 212 to displace the bottom end 150 of the connecting rod 132 axially and/or rotatively, in directions $D_1$ and $D_2$ respectively, relative to the axis XX' of the cylinder liner 110.

Figures 3A, 3B:
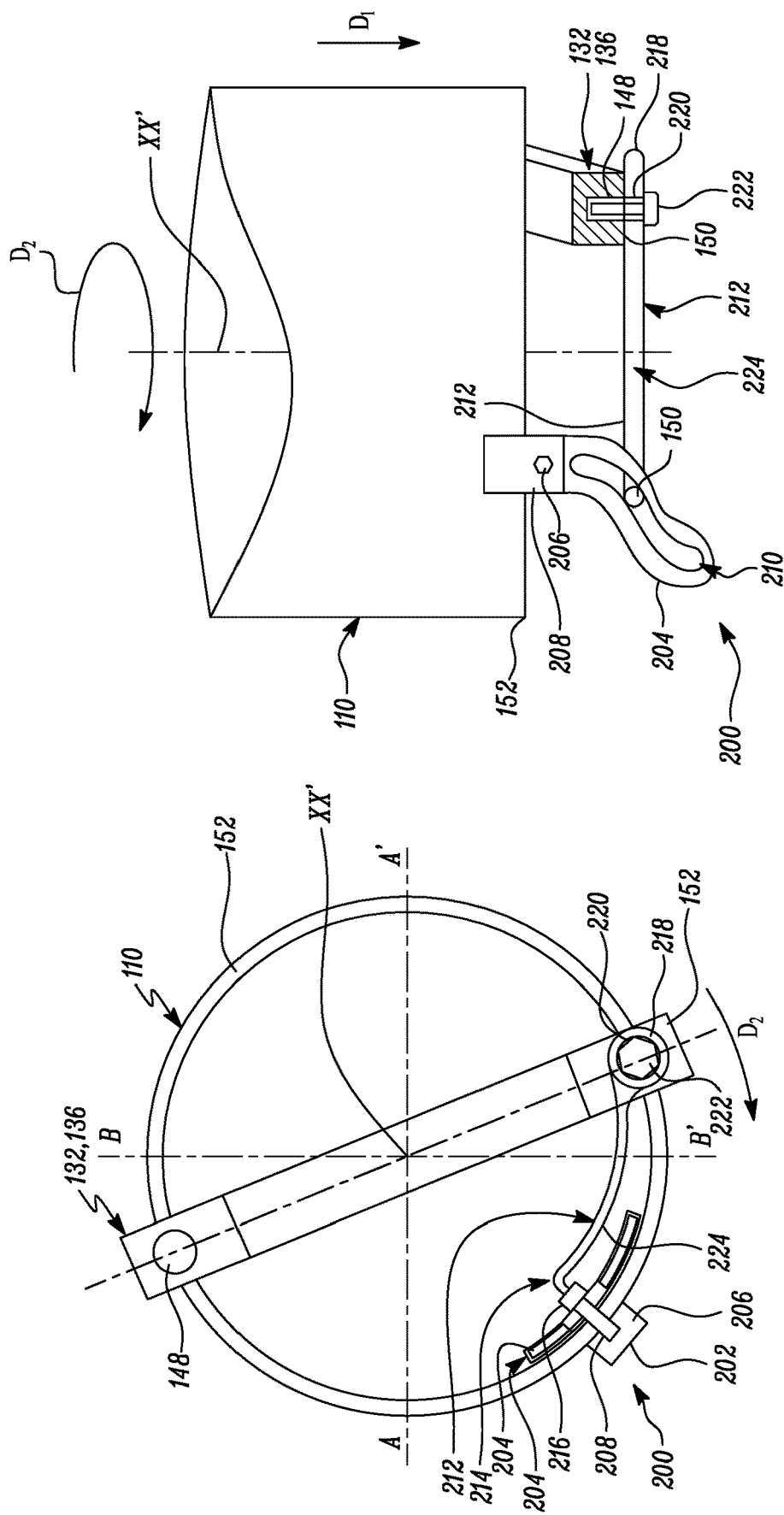
FIGS. 3A and 3B are bottom and front diagrammatic views of the cylinder liner, the connecting rod, and the adapter showing movement of the connecting rod coterminous with movement of a pin along a mid-portion of a groove associated with a holder mechanism of the adapter, in accordance with embodiments of the present disclosure.

Referring to FIG. 1 and as best shown in FIGS. 3A, 3B, and subsequently in FIGS. 4A and 4B, it may be noted that as the pin 216 courses through the curvilinear groove 210, the axial and/or rotational displacement of the connecting rod 132, in directions $D_1$ and $D_2$ respectively, would facilitate the bottom end 150 of the connecting rod 132 to be incident upon, come into contact with, and therefore, assemble with the crankshaft 140 while preventing the bottom end 150 of the connecting rod 132 from coming into contact with one or more components underlying the cylinder liner 110, for example, the cams 124 on either or both camshafts 122.

Figures 4A, 4B:
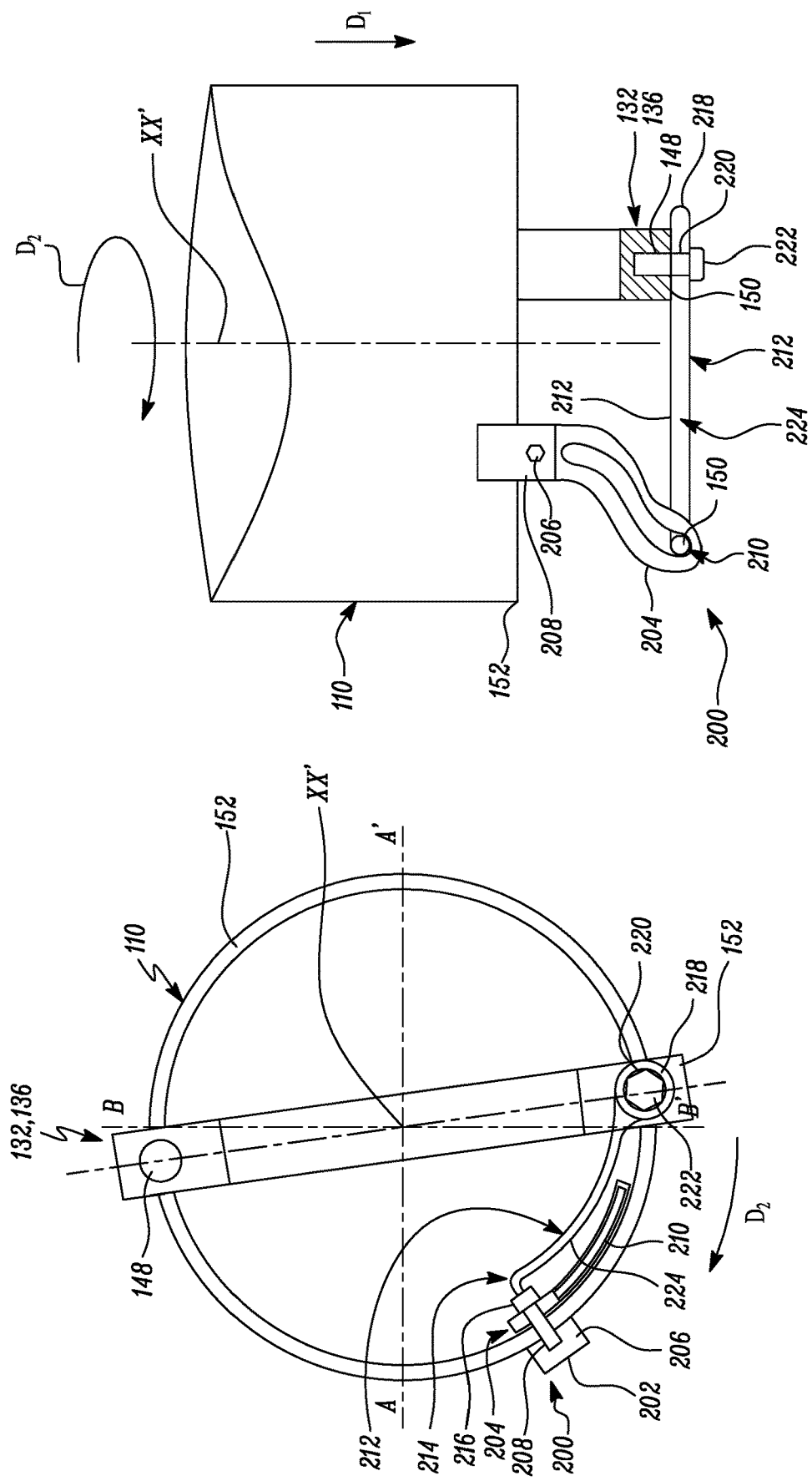
FIGS. 4A and 4B are bottom and front diagrammatic views of the cylinder liner, the connecting rod, and the adapter when the connecting rod is in a desired final position, in accordance with embodiments of the present disclosure.

As evident from the views of FIGS. 2B, 3B, and 4B, movement of the bottom end 150 of the connecting rod 132 would be coterminous with movement of the pin 216 along the groove 210. Also, to that effect, the link 212 disclosed herein would be configured to have a mid-portion that would be arcuately shaped so as to be disposed parallel to the circumference of the cylinder liner 110.

In embodiments herein, it may be noted that the holder mechanism 202 would be positioned, to releasably hold the bottom end 152 of the cylinder liner 110, at a pre-determined location on the circumference of the cylinder liner 110. This pre-determined location on the circumference of the cylinder liner 110 at which the holder mechanism 202 is positioned would correspond to an initial position of the bottom end 150 of the connecting rod 132, as best shown in the view of FIG. 2B, so that the bottom end 150 of the connecting rod 132 traverses an angular range about the axis XX' of the cylinder liner 110 towards a desired final position, as best shown in the view of FIG. 4B. The initial position and the resultant angular range would be selected such that when the bottom end 150 of the connecting rod 132 moves through the angular range from the initial position towards the desired final position, the bottom end 150 of the connecting rod 132 does not come into contact with one or more components underlying the cylinder 108, for example, the pair of cams 124 exemplarily shown in the view of FIG. 1.

Figure 5:
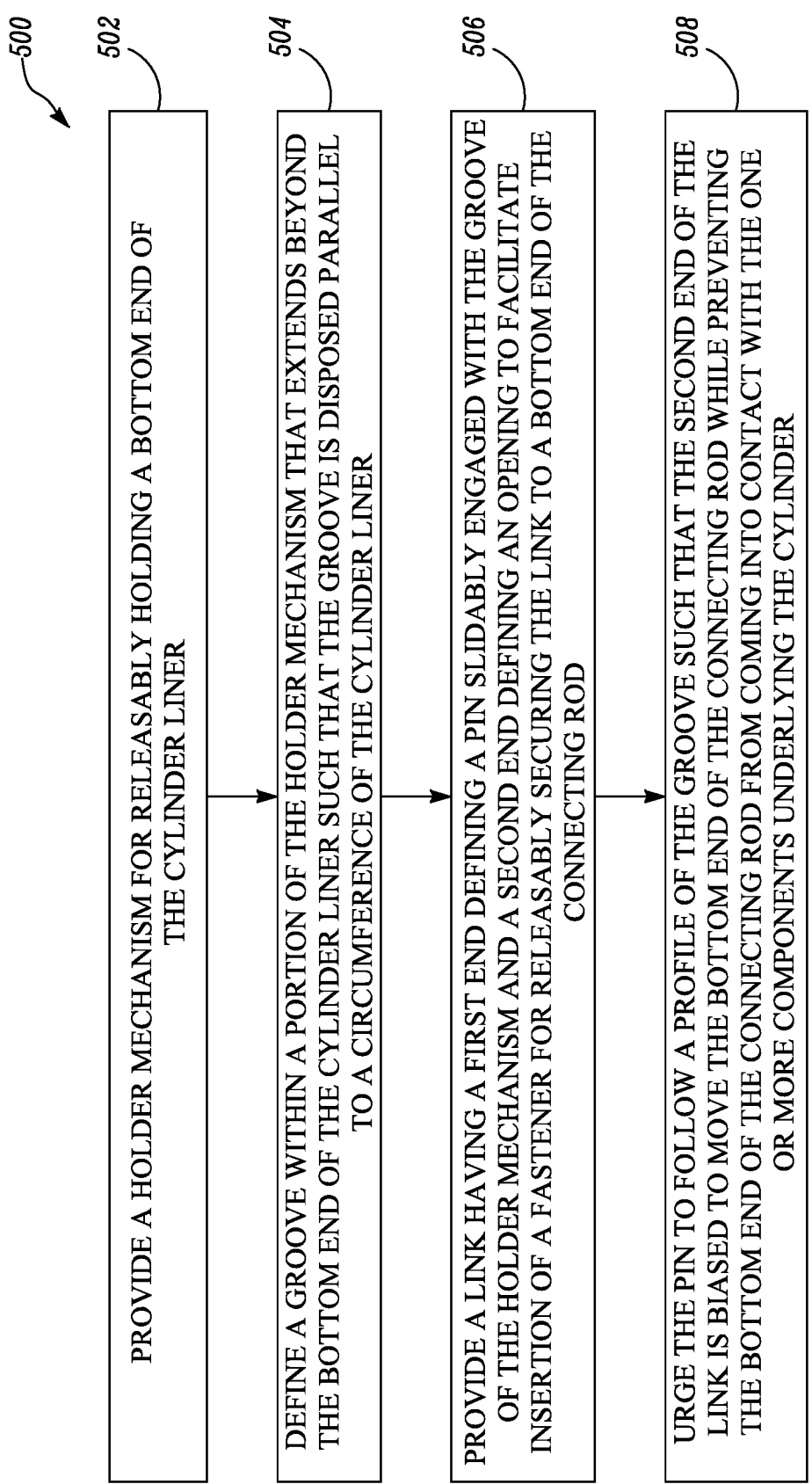
FIG. 5 is a flowchart of a method for positioning the connecting rod relative to one or more components underlying the cylinder of the exemplary engine block, in accordance with embodiments of the present disclosure.

FIG. 5 depicts a flowchart of a method 500 for positioning the connecting rod 132 relative to one or more components underlying the cylinder 108 of the engine block 106, in tandem with assembling the cylinder liner 110 to the engine block 106 vis-à-vis the cylinder 108 of the engine block 106. As shown, at step 502, the method 500 includes providing the holder mechanism 202 for releasably holding the bottom end 152 of the cylinder liner 110. Further, at step 504, the method 500 also includes defining the groove 210 within a portion of the holder mechanism 202 that extends beyond the bottom end 152 of the cylinder liner 110. As disclosed earlier herein, the groove 210 would be defined such that the groove 210 would be disposed parallel to the circumference of the cylinder liner 110.

Moreover, at step 506, the method 500 further includes providing the link 212 having the first end 214 defining the pin 216 slidably engaged with the groove 210 of the holder mechanism 202 and the second end 218 defining the opening 220 to facilitate insertion of the fastener 222 for releasably securing the link 212 to the bottom end 150 of the connecting rod 132.

Thereafter, as shown at step 508, the method 500 further includes urging the pin 216 to follow the profile of the groove 210 such that the second end 218 of the link 212 is biased to move the bottom end 150 of the connecting rod 132 while preventing the bottom end 150 of the connecting rod 132 from coming into contact with the one or more components underlying the cylinder 108.

Various embodiments disclosed herein are to be taken in the illustrative and explanatory sense and should in no way be construed as limiting of the present disclosure. All numerical terms, such as, but not limited to, "first", "second", "third", or any other ordinary and/or numerical terms, should also be taken only as identifiers, to assist the reader's understanding of the various embodiments, variations, components, and/or modifications of the present disclosure, and may not create any limitations, particularly as to the order, or preference, of any embodiment, variation, component and/or modification relative to, or over, another embodiment, variation, component and/or modification.

Further, all joinder references (e.g., connected, coupled, attached, sealed and the like) are only used to aid the reader's understanding of the present disclosure, and may not create limitations, particularly as to the position, orientation, or use of the components disclosed herein. Therefore, joinder references, if any, are to be construed broadly. Moreover, such joinder references do not necessarily infer that two elements are directly connected to each other.

Additionally, all positional terms, such as, but not limited to, "top", "bottom", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element relative to, or over, another element.

The above described implementation does not in any way limit the scope of the present disclosure. Therefore, it is to be understood although some features are shown or described to illustrate the use of the present disclosure in the context of functional components, such features may be omitted from the scope of the present disclosure without departing from the spirit of the present disclosure as defined in the appended claims.

INDUSTRIAL APPLICABILITY

Embodiments of the present disclosure have applicability for use in assembling cylinder liners and connecting rods to an engine block. With implementation of the present disclosure, technicians can assemble the cylinder liners and connecting rods to the engine block such that while the cylinder liner is in positioned within the cylinder of the engine block, the connecting rod traverses around obstacles presented by one or more components underlying the cylinder and comes into a desired final position to allow contact with, and therefore, facilitate assembly with the crankshaft of the engine.

With use of the apparatus disclosed herein, manufacturers of engines can help technicians assemble the engine fairly quickly, and in a relatively less tedious manner as compared to manually bringing corresponding features from two or more components of an engine into alignment so that the two or more components can be assembled. The present disclosure would therefore, also offset an amount of effort required in performing alignment and consequently, mitigate fatigue that was typically experienced by technicians previously in performing manual alignment of features from components that were to be assembled while traversing through spaces that were tight and/or tortuous in nature.

While aspects of the present disclosure have been particularly shown and described with reference to the embodiments above, it will be understood by those skilled in the art that various additional embodiments may be contemplated by the modification of the disclosed apparatus and method without departing from the spirit and scope of what is disclosed. Such embodiments should be understood to fall within the scope of the present disclosure as determined based upon the claims and any equivalents thereof

The invention claimed is:

1. An apparatus for positioning a connecting rod relative to one or more components underlying a cylinder of an engine block in tandem with assembling a cylinder liner to the cylinder of the engine block, the apparatus comprising:
a holder mechanism releasably holding a bottom end of the cylinder liner, wherein a portion of the holder mechanism is configured to extend beyond the bottom end of the cylinder liner to define a groove disposed parallel to a circumference of the cylinder liner;
a link pivotally connecting the cylinder liner to the connecting rod, the link comprising:
a first end defining a pin slidably engaged with the groove of the holder mechanism; and
a second end distal from the first end, the second end defining an opening therethrough, the opening configured to facilitate insertion of a fastener for releasably securing the link to a bottom end of the connecting rod.

2. The apparatus of claim 1, wherein movement of the bottom end of the connecting rod is coterminous with movement of the pin along the groove.

3. The apparatus of claim 1, wherein the groove has a curvilinear profile.

4. The apparatus of claim 3, wherein movement of the pin follows the curvilinear profile of the groove such that the second end of the link is biased to move the bottom end of the connecting rod in at least one of:
a direction parallel to an axis of the cylinder liner and a direction about the axis of the cylinder liner.

5. The apparatus of claim 1, wherein the link has a mid-portion arcuately shaped so as to be disposed parallel to the circumference of the cylinder liner.

6. The apparatus of claim 1, wherein the holder mechanism is positioned, to releasably hold the bottom end of the cylinder liner, at a pre-determined location on the circumference of the cylinder liner.

7. The apparatus of claim 6, wherein the pre-determined location on the circumference of the cylinder liner at which the holder mechanism is positioned corresponds to an initial position of the bottom end of the connecting rod so that the bottom end of the connecting rod traverses an angular range about the axis of the cylinder liner towards a desired final position.

8. The apparatus of claim 7, wherein the bottom end of the connecting rod moves through the angular range without coming into contact with the one or more components underlying the cylinder.

9. A method for positioning a connecting rod relative to one or more components underlying a cylinder of an engine block in tandem with assembling a cylinder liner to the cylinder of the engine block, the method comprising:
providing a holder mechanism for releasably holding a bottom end of the cylinder liner,
defining a groove within a portion of the holder mechanism that extends beyond the bottom end of the cylinder liner, the groove disposed parallel to a circumference of the cylinder liner;
providing a link having a first end defining a pin slidably engaged with the groove of the holder mechanism and a second end defining an opening to facilitate insertion of a fastener for releasably securing the link to a bottom end of the connecting rod; and
urging the pin to follow a profile of the groove such that the second end of the link is biased to move the bottom end of the connecting rod while preventing the bottom end of the connecting rod from coming into contact with the one or more components underlying the cylinder.

10. The method of claim 9, wherein the groove has a curvilinear profile.

11. The method of claim 10, wherein movement of the pin follows the curvilinear profile of the groove such that the second end of the link is biased to move the bottom end of the connecting rod in at least one of:

a direction parallel to an axis of the cylinder liner and a direction about the axis of the cylinder liner.

12. The method of claim 9, wherein movement of the bottom end of the connecting rod is coterminous with movement of the pin along the groove.

13. The method of claim 9, wherein the link is arcuately shaped so as to be disposed parallel to the circumference of the cylinder liner.

14. The method of claim 9, wherein the holder mechanism is positioned, to releasably hold the bottom end of the cylinder liner, at a pre-determined location on the circumference of the cylinder liner.

15. The method of claim 14, wherein the pre-determined location on the circumference of the cylinder liner at which the holder mechanism is positioned corresponds to an initial position of the bottom end of the connecting rod so that the bottom end of the connecting rod moves through an angular range about the axis of the cylinder liner towards a desired final position.

* * * * *